US006659319B2

(12) United States Patent
Purpura

(10) Patent No.: US 6,659,319 B2
(45) Date of Patent: Dec. 9, 2003

(54) LAPTOP TRANSPORT AND SUPPORT SYSTEM FOR MOBILE ENVIRONMENTS

(75) Inventor: William J. Purpura, Anaheim, CA (US)

(73) Assignee: The Boeing Company, Chicago, IL (US)

( * ) Notice: Subject to any disclaimer, the term of this patent is extended or adjusted under 35 U.S.C. 154(b) by 120 days.

(21) Appl. No.: 09/940,140

(22) Filed: Aug. 27, 2001

(65) Prior Publication Data

US 2003/0038149 A1 Feb. 27, 2003

(51) Int. Cl.[7] ............................................. A45C 15/00
(52) U.S. Cl. ...................... 224/576; 224/270; 224/275; 224/585; 224/586; 224/630
(58) Field of Search ................................ 224/576, 577, 224/153, 578, 579, 580, 581, 582, 585, 586, 628, 630, 270, 275; 206/576, 305, 449

(56) References Cited

U.S. PATENT DOCUMENTS

| 4,896,776 | A | * | 1/1990 | Kabanuk et al. | ............ | 206/576 |
| 5,214,574 | A | * | 5/1993 | Chang | ......................... | 361/680 |
| 5,226,540 | A | * | 7/1993 | Bradbury | .................... | 206/576 |
| 5,573,155 | A | | 11/1996 | Sadler | | |
| 5,808,865 | A | * | 9/1998 | Alves | ......................... | 361/685 |
| 5,820,141 | A | | 10/1998 | Wilkerson et al. | | |
| 5,826,771 | A | | 10/1998 | Peng | | |
| 5,831,818 | A | | 11/1998 | Dat | | |
| 5,881,934 | A | * | 3/1999 | Hung | ......................... | 224/275 |
| 5,973,917 | A | * | 10/1999 | White | ......................... | 361/683 |
| 5,984,347 | A | * | 11/1999 | Blanc-Rosset | .............. | 280/727 |
| 6,105,764 | A | | 8/2000 | Scicluna et al. | | |
| 6,109,434 | A | | 8/2000 | Howard, Jr. et al. | | |
| D432,311 | S | | 10/2000 | Weinreb | | |
| 6,131,734 | A | | 10/2000 | Hollingsworth et al. | | |
| 6,210,037 | B1 | | 4/2001 | Brandon, Jr. | | |
| 6,237,766 | B1 | | 5/2001 | Hollingsworth | | |
| D443,417 | S | | 6/2001 | Hillman | | |
| 6,257,407 | B1 | | 7/2001 | Truwit et al. | | |
| 6,349,864 | B1 | * | 2/2002 | Lee | ............................. | 224/270 |

* cited by examiner

*Primary Examiner*—Stephen K. Cronin
(74) *Attorney, Agent, or Firm*—Harness Dickey & Pierce P.L.C.

(57) ABSTRACT

A laptop computer transport and support system for a mobile environment such as an airplane, bus or train is embodied as a wheeled clamshell style backpack carrying case with a retractable handle. The system is employed by unzipping three case edges and lifting a hinged protective cover thereby exposing a computer. The backpack straps unhook from the cover and secure to a user's seatback or around a user's headrest while strap posts at an opposite backpack strap end extend from the case and prevent strap interference with the user. A foldable or detachable handle permits retractable handle posts to extend on each side of the user and support the system against the seatback instead of the user when the system is used. Optionally, computer peripherals within a compartmentalized base are connected within the base to a docking station port and provide the computer with quick access to the peripherals.

21 Claims, 8 Drawing Sheets

LAPTOP TRANSPORT AND SUPPORT SYSTEM FOR MOBILE ENVIRONMENTS

FIELD OF THE INVENTION

The present invention relates to a laptop computer storage and transportation device, and more specifically to a personal transportation, handling and support system for a portable computing device adaptable to a mobile environment.

BACKGROUND OF THE INVENTION

Laptop computer carrying cases exhibit a broad range of features related to ease of carrying, storage capability, and functionality. However, while current laptop computer carrying cases have generally proven to be satisfactory for their applications, each is associated with its share of limitations. One major limitation with many current carrying cases for laptop computers and related computing devices is their inability to provide a fold-down work area that permits a laptop computer or other computing device to remain in the carrying case while the laptop computer or computing device is in use. The need to remove the laptop computer from its carrying case during use necessitates the laptop's placement on a separate work area and requires a separate storage space for the carrying case.

Another problem of carrying devices lies in their inability to adapt to a seatback when a user desires to operate his or her computer in a mobile environment, such as while on an airplane, automobile, bus, train, etc. This problem has been indirectly addressed by the prior art through the incorporation of "service trays" that store in seatbacks of seats positioned in front of users, and, which fold down to permit travelers to eat, write, read, etc. However, the typical airline seatback service tray was not designed for a laptop computer, so their use is one of adaptation and not specific design.

The problems associated with service trays are many. First, the service tray does not angularly adjust when the seatback, to which the service tray is attached, reclines. Second, when the service tray must be stowed to permit an adjacent passenger to exit the same row as the computer user, the computer must be lifted with one hand while the service tray is restored to its stowed position with the user's remaining hand. This creates a cumbersome situation for the computer user.

Another limitation with current computing device carrying cases is their lack of a hard surface which can serve as a work area. Current computing device carrying cases do not provide such a feature and require the user to locate an alternate hard surface such as a table or chair when such a surface is desired. Alternatively, the user may rest the device on their lap which is unsatisfactory due to its weight and heat build-up. In this regard, the user is presented with poor access to the keyboard because of the resulting proximity to the user's body.

Still yet another limitation of current computing device carrying cases is their inability to employ external computing devices while the devices are connected and concealed within the carrying case. The prior art has minimally addressed the accommodation of external devices by supplying compartments and pockets in which to store external devices but the prior art does not permit those devices to be utilized in conjunction with the computing device while the devices are in their stowed positions within a carrying case.

Another limitation with current computing device carrying cases lies in their lack of a docking port to quickly provide access to on-board peripheral devices and a power source. The prior art solution to connecting to external devices requires individually connecting the devices to the computer.

Still yet another limitation with current computing device carrying cases lies in the lack of an on-board privacy screen. The prior art solution to any necessary privacy, with regard to carrying cases, involves simply closing the case cover to shield the contents on the computer screen. The problem with this approach to privacy is that it is cumbersome to invoke and actually requires the computer user to stop working when the case top is closed.

What is needed then is a device that does not suffer from the above limitations. This in turn, will provide a mobile computing device carrying case with a self-supporting fold-down user work area which does not directly impact a users physical condition while operating such devices. In addition this invention will provide a method of adjustable support from a user seat for the carrying case and fold-down work area, a hard surface work area, a docking port and means to accommodate external or spare devices while stored in the case, and privacy for the user.

SUMMARY OF THE INVENTION

In accordance with the teachings of the present invention, a laptop computer transport and support system (LCTSS) for mobile environments is disclosed. The system provides a mobile carrying case containing detachable backpack straps that are capable of securing to a laptop user's seatback. Additionally, the system provides a base portion hinged with a cover portion permitting the user to position the cover portion wherever he/she desires relative to the base. Furthermore, the system provides dual pull-out carrying handle rods that also serve as standoff rods to provide a user with sufficient horizontal clearance to comfortably operate a laptop with the support system in place. Finally, the system provides optional, retractable docking station ports to permit the laptop to be quickly plugged into a power source and peripheral devices in a compartmentalized system base.

In one preferred embodiment, the LCTSS for mobile environments includes a base portion and a cover portion. Along one edge of each portion a ratcheting piano-type hinge permits the case to open, close and maintain any open position without support rods or other devices. The balance of the mating portion closes with a zipper. Additionally, the LCTSS provides a sliding or retractable hard surface to accommodate an external pointing device or to provide work space. Dual sliding rods attached to a handle permit a user to pull the LCTSS on built-in wheels. Furthermore, the LCTSS includes adjustable shoulder straps permitting the LCTSS to be carried as a backpack, or which can be used as adjustable support straps when the LCTSS is attached to a user's seatback while in use as a support system. Finally, when the LCTSS is in use as a support system, the retractable handle rods are user adjustable and provide clearance between the computing device and the user.

In another preferred embodiment, the LCTSS includes a compartmentalized peripheral device area capable of housing peripheral computing devices, power dividers, computer cables and cords or other computer components. The compartmentalized peripheral area replaces the standard base of the above-described embodiment.

In yet another preferred embodiment, the LCTSS includes a retractable docking port permitting the laptop or computing device to be quickly plugged thereinto in order to access an optional compartmentalized base portion. The retractable docking port permits the laptop to be coupled to a battery and a charging system, and a host of computer peripherals such as a CD-ROM, floppy disk drives, battery or additional computer related devices.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
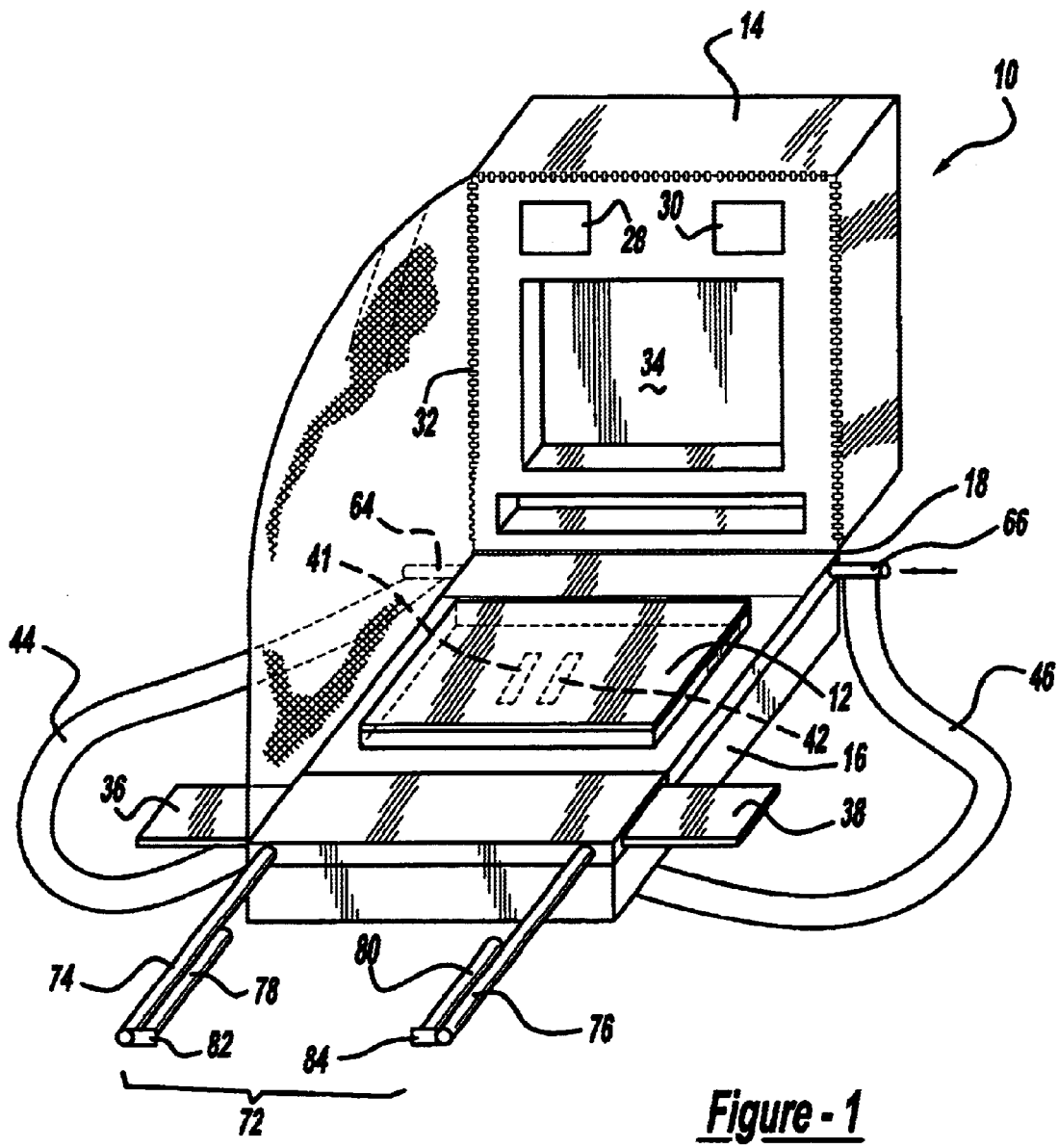
FIG. 1 is a perspective view of a laptop computer transport and support system for mobile environments shown in its open position.
Figure 3:
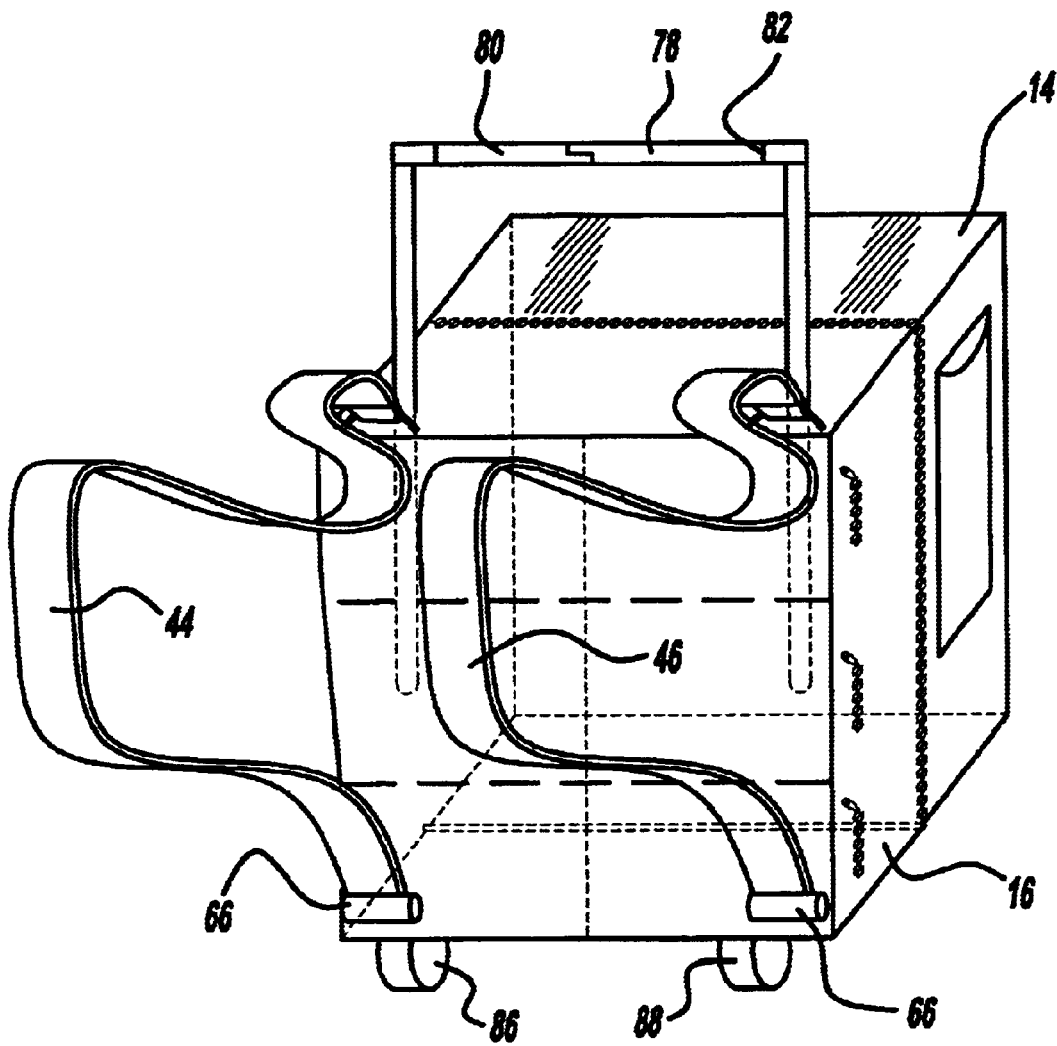
FIG. 3 is a perspective view of a laptop computer transport and support system for mobile environments shown with support straps in backpack mode in its closed position showing an optional compartmentalized base, wheels, and retractable handle.
Figure 8:
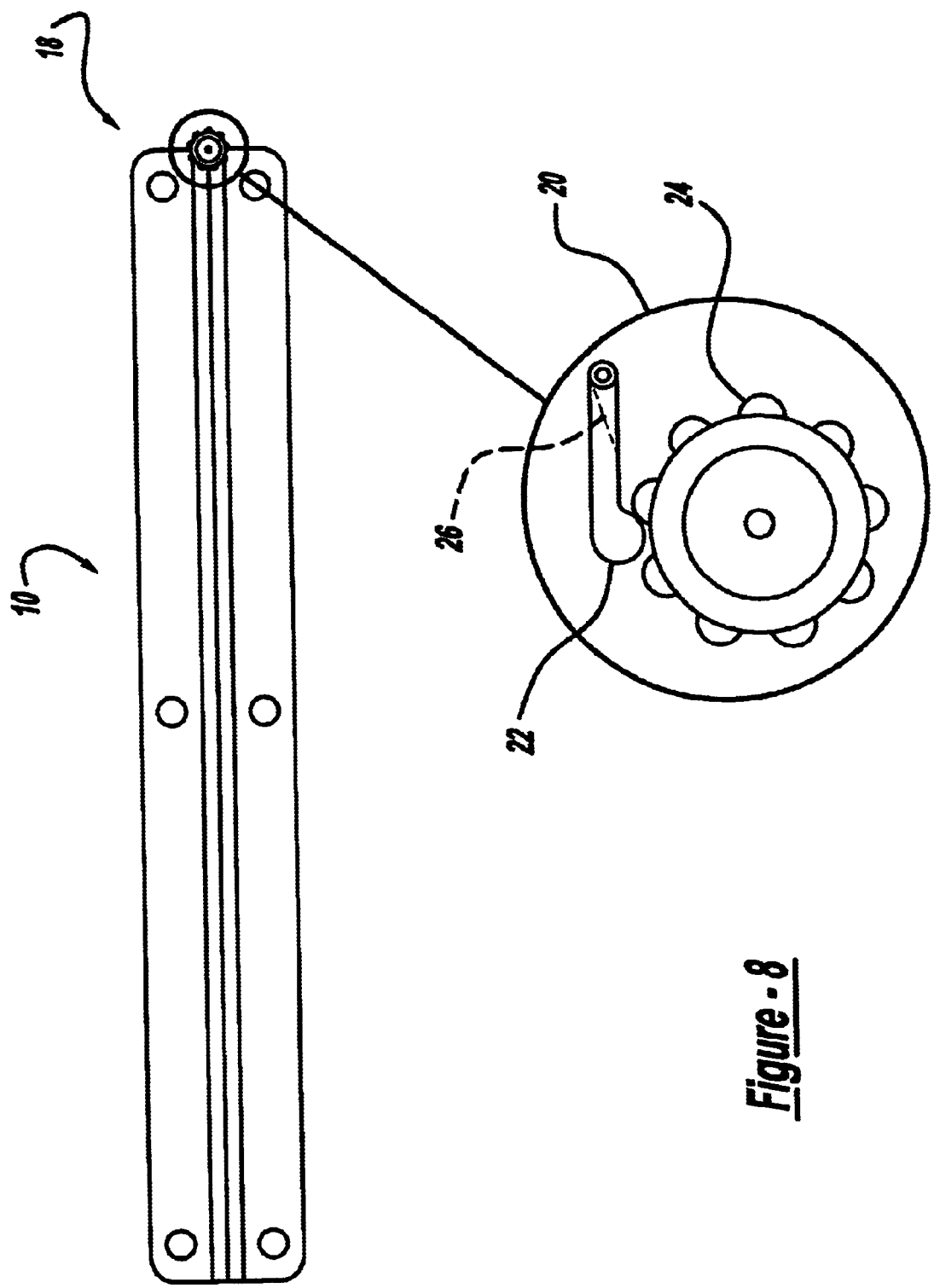
FIG. 8 is a hinge with a representative pawl and sector ratcheting system.

With reference to FIG. 1 of the drawings, a laptop computer transport and support system (LCTSS) 10 for mobile environments is depicted. The LCTSS 10 provides a system for transporting and employing a computing device such as a laptop computer 12. It should be noted that while a laptop computer 12 is shown and discussed as the device used in conjunction with the principles of the present invention, virtually any personal electronic device such as an entertainment unit or personal computer can be adapted for use with the LCTSS 10. The LCTSS 10 exhibits a cover 14 and a base 16 which pivots about a hinge 18 which runs along the length of one juncture between the cover 14 and base 16. FIG. 8 shows a perspective view of the hinge 18 which possesses a ratcheting mechanism 20. The ratcheting mechanism 20 is comprised of a biased pawl 22 and a sector 24. The pawl may be biased using a metal with sufficient resilient or elastic characteristics, or a spring 26 located internally or externally to the pawl 22 may bias the pawl 22. However biased, the pawl 22 biases into the sector 24 yet permits cover 14 rotation clockwise and counter-clockwise under user-supplied hand forces. Furthermore, sufficient force is provided by the pawl 22 to restrain cover 14 movement when the cover 14 is under its own weight or when the cover 14 is in an in-use arrangement with storage pockets 28 and 30 full of diskettes or other supplies. Regardless of the cover's open position or the items stored in the cover 14, pivoting will not occur unless an external force is applied. When the LCTSS 10 cover 14 is closed, or the LCTSS 10 is being transported, a zipper 32 running along the non-hinged edges of the cover 14 and base 16 is normally in its mated position as shown in FIG. 3.

With continued reference to FIG. 1 additional features of the LCTSS 10 will be explained. The basic system of the LCTSS 10 supports a personal electronic device such as laptop computer 12 in a central location on the base 16. An associated recess 34 in the cover 14 encompasses the laptop 12 and provides protection when the cover 14 is in its closed position of FIG. 3. The LCTSS 10 additionally possesses sliding shelves 36 and 38 located on each side of the base 16 to serve as a location for a mouse or other pointing device or simply as additional user work space. The laptop computer 12 typically secures to the base 16 with bottom-mounted Velcro® strips 40 and 42, shown in phantom, or securing straps (not shown).

Figure 11:
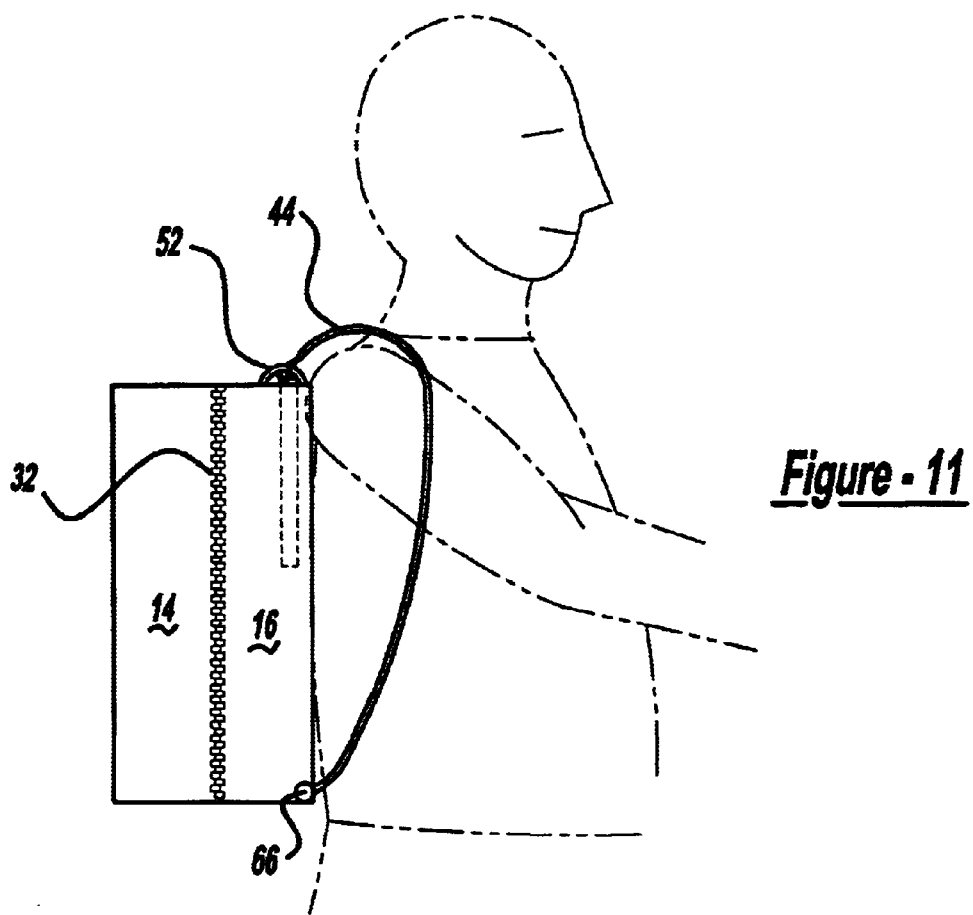
FIG. 11 is a side view of a laptop computer transport and support system for mobile environments in its closed position and being transported as a backpack.

A major advantage of the LCTSS 10 is that it possess adjustable shoulder straps 44 and 46 which allow the LCTSS 10 to be carried as a backpack, as shown in FIG. 11. With continued reference to FIGS. 1 and 4, features of the shoulder straps 44 and 46 will now be explained. Shoulder strap 44 possesses a C-hook 48. A C-hook 50 also resides at an end of shoulder strap 46. C-hooks 48 and 50 attach and detach to U-rings 52 on the base 16 by means of a quick connector 54, commonly known in the art.

Figure 6:
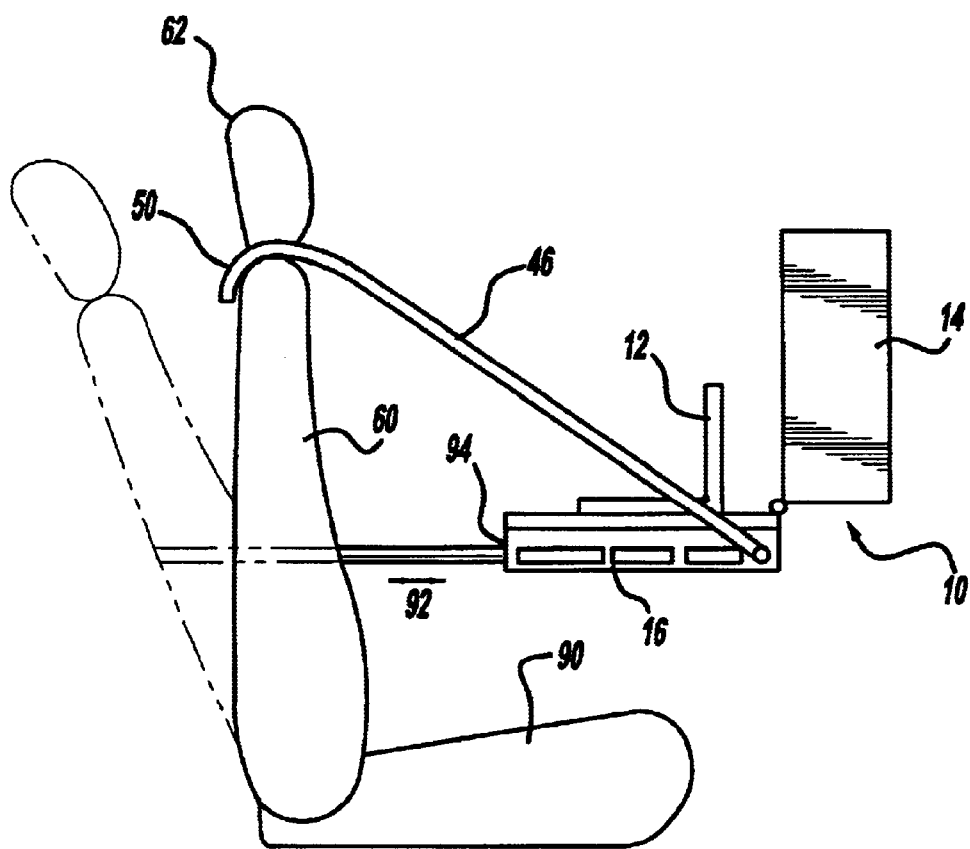
FIG. 6 is a side view of a laptop computer transport and support system for mobile environments attached to a seat-back in one of its in-use positions.
Figure 7:
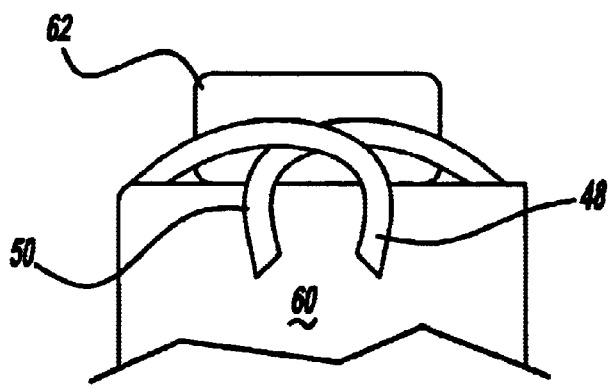
FIG. 7 is a rear view of a seatback showing how the support strap C-hooks interlock behind a headrest of the seatback.

Continuing with reference to FIG. 11, the C-hook 50 of the shoulder strap 46 generally conforms to the shoulder 56 of a user 58 making the LCTSS 10 easily transportable. Additionally, the C-hook 50 serves a dual purpose of generally conforming to a seatback 60 (FIG. 6) to secure the LCTSS 10 when in use, but also may interface behind a headrest 62 of the seatback 60 by interlocking the C-hooks 48 and 50 as shown in FIG. 7. Interlocking C-hooks 48 and 50 behind the headrest 62 of the seatback 60 may be necessary in the event a user's seat is mounted against a wall, or the seatback portion is slanted or contoured in such a way that the C-hooks cannot be accommodated over the seatback 60.

Figure 4:
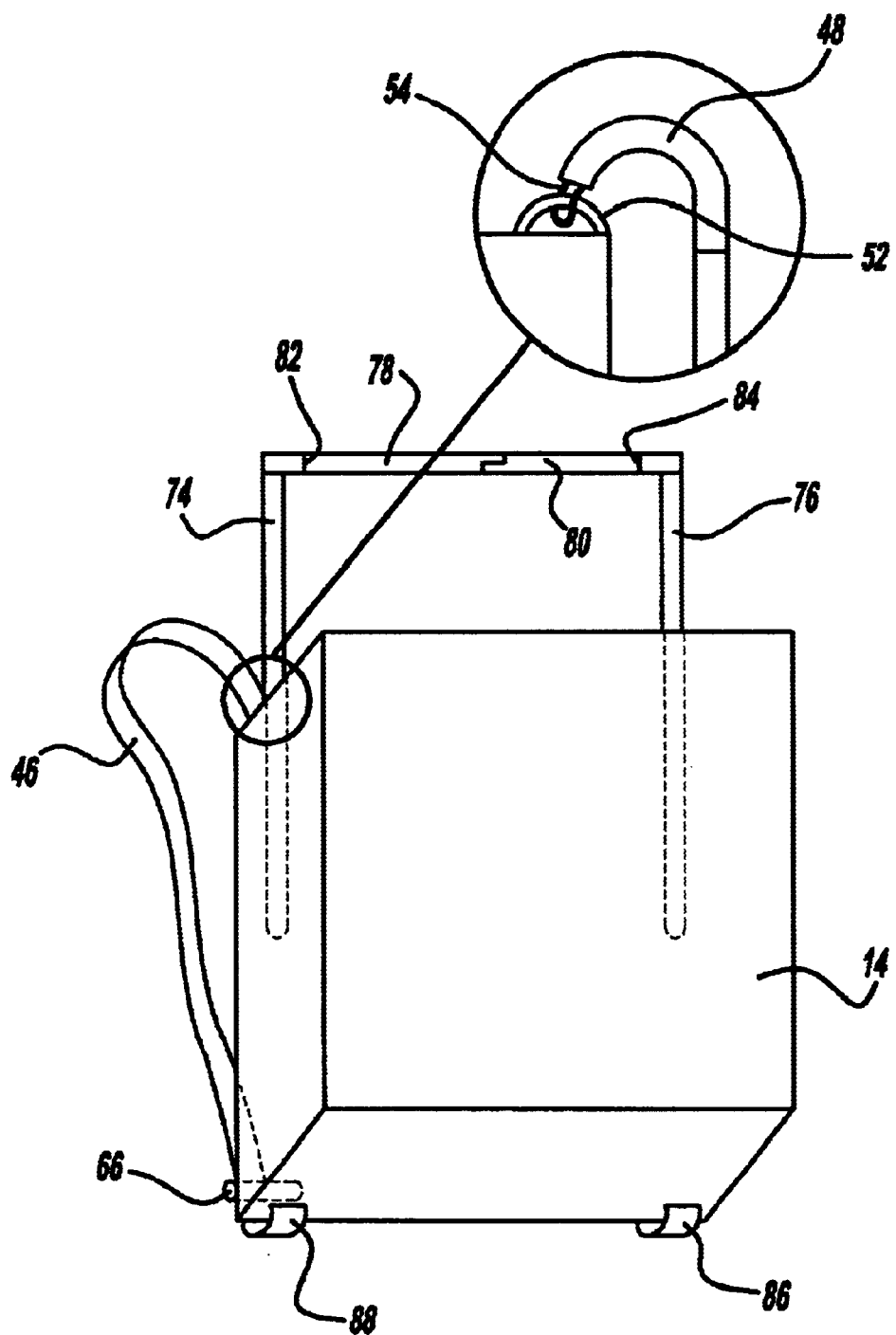
FIG. 4 is a perspective view of a laptop computer transport and support system for mobile environments in its closed position showing detachable backpack straps in seat-support mode, wheels, and retractable handle.

Turning to the end of the shoulder straps 44 and 46 opposite the C-hooks, FIG. 1 shows strap rods 64 and 66. Turning to strap rod 66, shoulder strap 46 attaches to and pivots about strap rod 66. Furthermore, strap rod 66 retracts within base 16 when the LCTSS 10 is being carried as a backpack as shown in FIGS. 4 and 11 but extends to the position shown in FIG. 1 when the laptop computer 12 of the LCTSS 10 is being used in one of its intended positions as shown in FIG. 6. The extension of strap rod 66 during laptop use permits the shoulder strap 46 to be used as a support strap and remain outside of a user's immediate work area. Furthermore, the extension of strap rod 66 permits the LCTSS 10 to be used in conjunction with a detachable privacy screen 68. When the privacy screen 68 is in use, the strap rod 64 is in an extended position so the strap 44 will not interfere with the view of the laptop computer 12. Additionally, a privacy screen attaches to the opposite side of the LCTTS 10. If privacy is not necessary or desired, the privacy screen is detachable and storable in compartment 70. The privacy screen 68 attaches by any of a number of methods such as Velcro®, zippers, etc. Alternatively, the privacy screen 68 could be permanently attached to the LCTSS 10 and not detachable.

Turning to FIGS. 1, 4 and 11, the LCTSS 10 includes a retractable handle 72 having retractable handle rods 74 and 76. Handle rods 74 and 76 each have a handle portion 78 and 80 which connect at the end of the handle rods 74 and 76. Additionally, the handle portions 78 and 80 connect to each other using a quick connection mechanism (not shown). Upon detaching handle portions 78 and 80, each folds against and becomes parallel to its respective handle rod via hinges 82 and 84, respectively. Alternatively, each handle portion 78 and 80 may detach from its respective handle rod 74 and 76.

An exemplary use of the LCTSS 10 will now be explained with primary reference to FIGS. 1, 4, 6, and 8–11. Typically, the user 58 (FIG. 11) will carry the LCTSS 10 on his or her back, or alternatively, the LCTSS 10 may be transported using its retractable handle 72 and on-board wheels 86 and 88 as shown in FIGS. 3 and 4. When desiring use of the LCTSS 10, a user simply sits into a seat 90 as shown in FIG. 6 and slides strap rods 64 and 66 from their retracted positions of FIG. 4 outwardly to the position shown in FIG. 1. Continuing with reference to FIG. 4, the C-hook 50 of shoulder strap 46 is detached from the base 16 using its quick connector 54 and C-hook 50 is secured over the seatback 60. The same is done with shoulder strap 44 and C-hook 48 using the quick connector 54. In the event a seatback 60 will not accommodate the C-hooks 48 and 50, they may alternately be placed around headrest 62 and interlocked as shown in FIG. 7. Next, handle portions 78 and 80 are disconnected to make handle rods 74 and 76 available for extension to provide support and a desired amount of standoff. Standoff 92 is depicted in FIG. 6 as the distance between a seatback 60 and a front surface 94 of the LCTSS 10. The amount of standoff 92 will depend upon user preference and the position of seatback 60. When the LCTSS 10 is suspended as depicted in FIG. 6, the handle rods 74 and 76 permit the LCTSS 10 weight to act against the seatback 60 as opposed to a user (not shown) if the handle portions 78 and 80 were not removed or disconnected.

Figure 2:
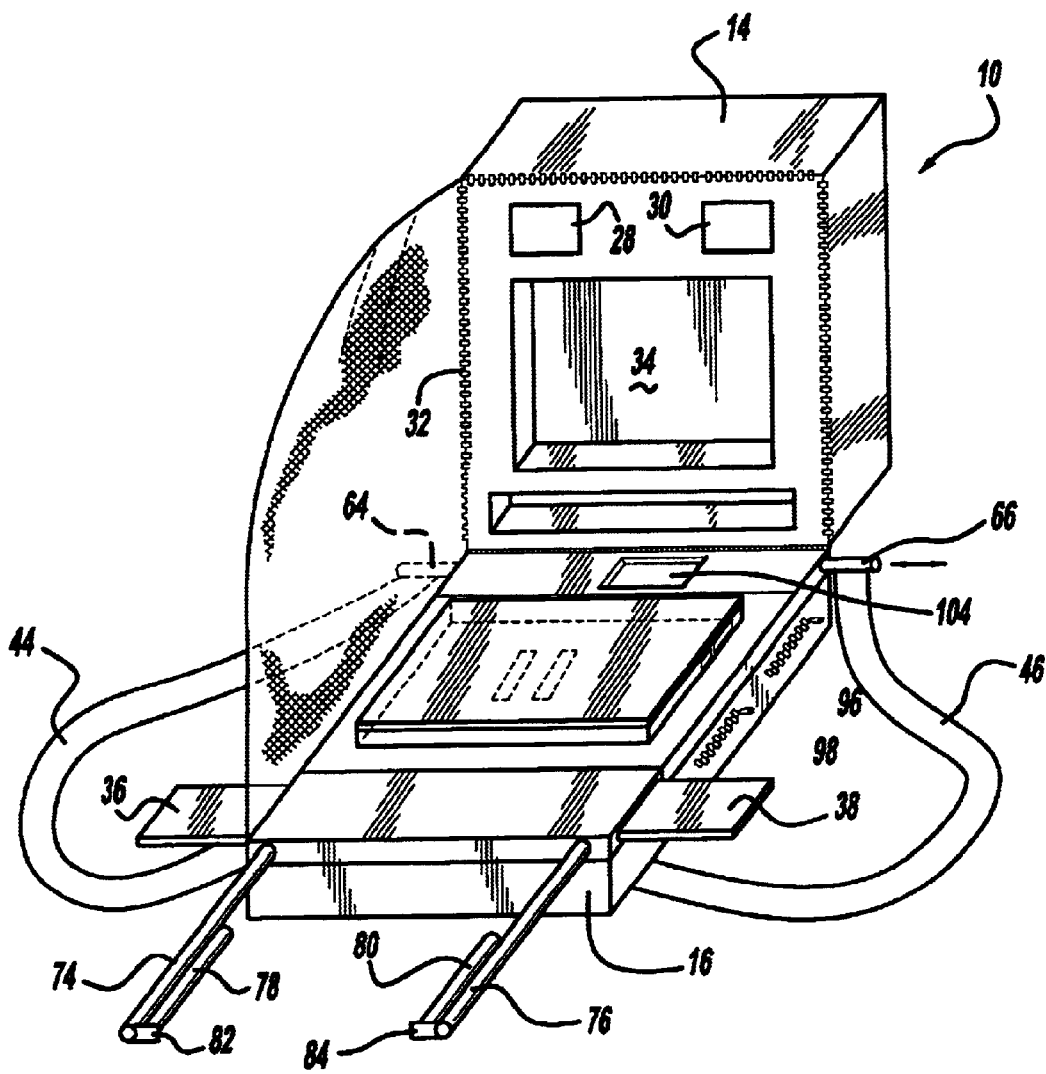
FIG. 2 is a perspective view of a laptop computer transport and support system for mobile environments in its open position showing an optional compartmentalized base.
Figure 5:
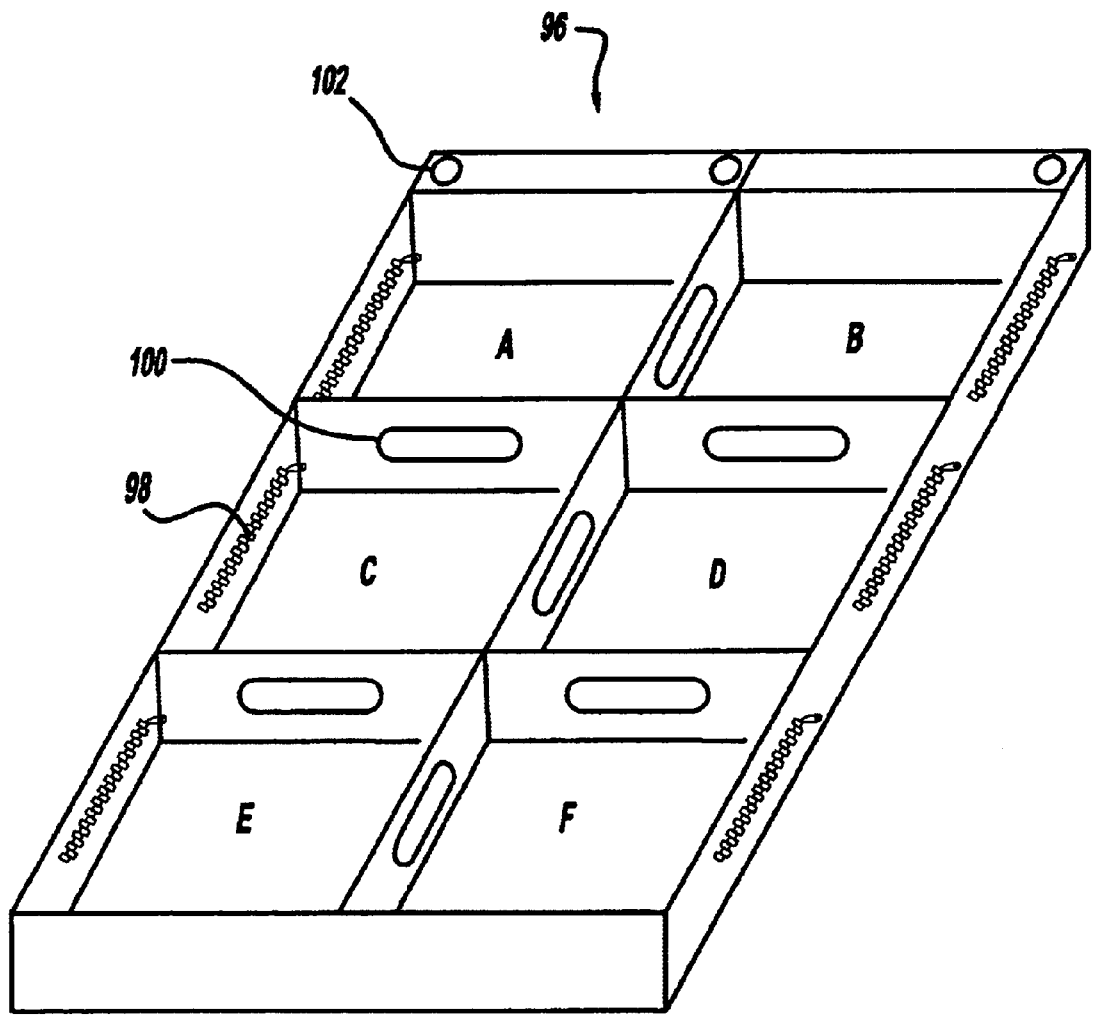
FIG. 5 is a perspective view of an optional compartmentalized base showing compartments for computer peripherals.

Turning now to FIGS. 2 and 5, another embodiment of the LCTSS 10 includes an optional compartment base 96 that is interchangeable with the base 16 of FIG. 1. The compartment base 96 consists of a series of inter-connected compartments A–F that may house computer related devices, accessible through a plurality of zipper slots 98, one for each compartment. The compartment base 96 shown in FIG. 5 contains six compartments, however, those skilled in the art will realize that the compartment base 96 may contain as many compartments as are necessary to fulfill the desired use. Utilizing compartments A–F may take on a variety of scenarios and permit the LCTSS 10 to realize multiple capabilities. The compartment devices capable of filling the compartments may comprise, but are not limited to, a power supply, storage batteries, a CD-ROM, a tape drive, a floppy disk drive, and a battery charger. The compartments A–F are interconnected so device cords and cables may be routed in the compartment base 96 via wire access holes 100 to minimize exterior cables routed from compartment to compartment or from a compartment to the laptop computer 12. Since no components of the system 10 are actually part of the compartment base 96 itself, components are easily interchangeable and easily upgradeable with changing technology. Compartment base 96 is easily interchangeable with the base 16 by utilizing a plurality of mounting holes 102 with a standard fastener.

Figure 9:
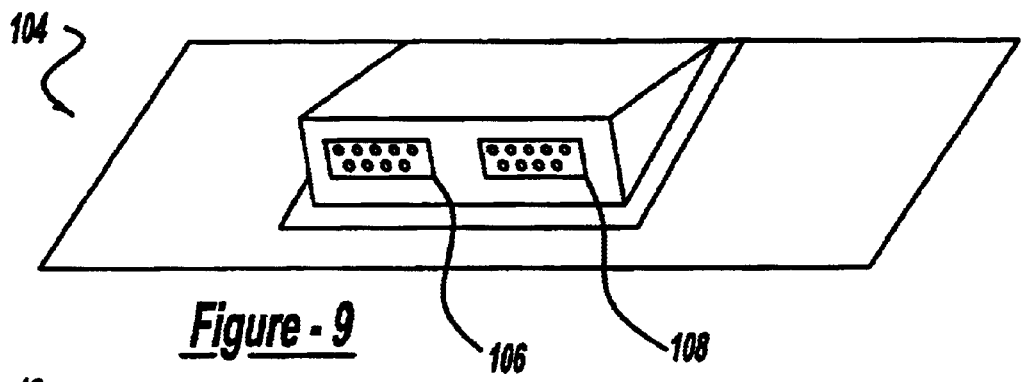
FIG. 9 is an enlarged view of a retractable docking station showing computer docking ports.
Figure 10:
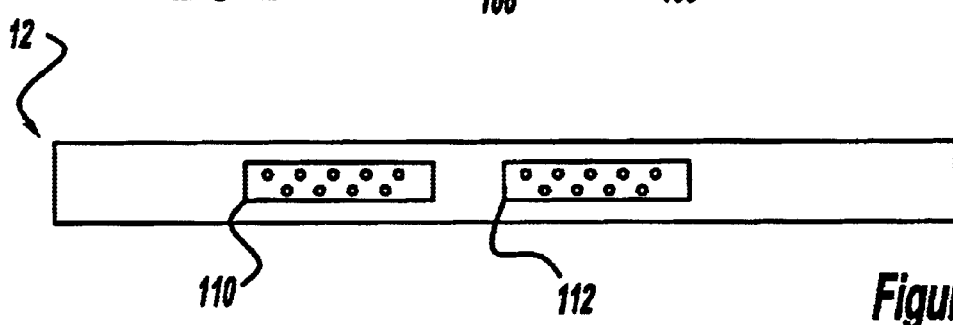
FIG. 10 is an enlarged view of a side or rear of a computer showing representative computer docking ports.

Still yet another embodiment of the system involves further integration of compartment base 96. This embodiment is similar to the embodiment above in that it utilizes the compartment base 96, however this embodiment utilizes a flip-up docking station port 104 resident above the compartment base 96 as shown in FIGS. 2 and 9. FIG. 9 shows that the docking station port 104 typically has representative docking plugs 106 and 108 enabling a user to simply flip up the docking station port 104 and slide computer plugs 110 and 112 (FIG. 10) of the laptop computer 12 into docking plugs 106 and 108. The docking station port 104 is modular so that accommodation of various brands of laptop plug configurations is possible by utilizing a standard adapter (not shown). In this embodiment, the compartment base 96 also has interconnected compartments A–F as shown in FIG. 5, so no cables or cords need exit the compartments through the zippered slots 98 along the sides of the compartment base 96. Power to all internal devices is supplied by a power supply with cords routed through wire access holes 100. However, a user could utilize external cords if necessary. Additionally, the peripheral devices connect within the compartment base 96 to the docking station port 104 so the laptop computer 12 may simply be pushed into the docking station port 104 to access all devices. This eliminates the need for a user to connect individual cables to their respective ports on the laptop computer 12. To successfully conduct communications of any type between the laptop computer 12 and the docking station port 104, the laptop computer 12 itself is again held firmly to the compartment base 96 with straps or Velcro® strips to assure signal integrity across the docking station port 104. Also, because of the compartment base 96, a resident power supply will permit standby re-charge of two storage batteries, one in the laptop and one in a compartment A–F, as long as the system is connected to an external power source. "Seat power" is that AC or DC power supplied at a seat location in an airplane, bus, or any other mobile environment. "Automobile power" is typically DC power supplied to the interior of an automobile, traditionally through a cigarette lighter, well known in the art.

The laptop computer 12 may remain in place and plugged into the docking station port 104 in the LCTSS 10 to retain full expanded capabilities, or simply be removed from the LCTSS 10 and hand carried for use as a traditional, low weight laptop computer with reduced capabilities. If removed, when the laptop computer 12 is returned to the LCTSS 10, expanded capabilities are again available via the docking station port 104 which permits access to the devices resident in compartments A–F of compartment base 96.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A transport and support system for a portable computing device for use in a vehicle, the system comprising:

a base portion for supporting the computing device during use thereof;

a cover secured to the base portion to enclose the computing device within said system when said computing device is not in use;

at least one strap element secured to one of said base portion and said cover, and adapted to have a portion thereon secured to a first portion of a component of said vehicle adjacent to where a user is positioned on said vehicle;

a retractable handle assembly adapted to be substantially enclosed within one of said base portion and said cover when said system is not in use, and to be extended into an operative position to engage a second component of said vehicle, to thereby assist in supporting said base portion and said computing device in front of said user for convenient use.

2. The system of claim 1, wherein said strap element is secured to at least one of a seat back and a headrest of a seat carried on-board said vehicle.

3. The system of claim 1, wherein said retractable handle assembly is positioned against a portion of a seat carried on-board said vehicle when said handle assembly is in said operative position, to thereby assist in supporting said system from said seat in a position wherein said computing device can be conveniently used by said user when said user is seated in said seat.

4. The system of claim 1, further comprising a pair of strap elements for engaging said first portion of said component of said vehicle;

wherein said first component comprises a seatback of a seat; and wherein said handle assembly includes at least one member adapted to engage a portion of said seat when said handle assembly is extended into its operative position;

said system operating to provide a work surface suspended from said seat.

5. A laptop transport and support system for mobile environments comprising:

a base portion and a cover portion, said base portion and said cover portions being connected by a hinge to secure said cover portion to said base portion;

a first handle rod having a first end and a second end, said first end of said first handle rod retractable into said base portion;

a second handle rod having a first end and a second end, said first end of said second handle rod retractable into said base portion;

a handle connecting said second end of said first handle rod and said second end of said second handle rod, said handle comprising a first handle piece and a second handle piece, said first handle piece and said second handle piece being detachable from each other;

a first shoulder strap and a second shoulder strap, each of said first and second shoulder straps having a first end and a second end, said first end of said first and said second shoulder strap connected to said cover portion, said second end of said first and said second shoulder strap connected to said base portion; and a first "C" hook at said first end of said first shoulder strap and a second "C" hook at said first end of said second shoulder strap, said first and said second "C" hooks to facilitate the hanging of said cover portion and said base portions during laptop use.

6. The laptop transport and support system of claim 5 further comprising:

a detachable pie-shaped shield having a first edge and a second edge, wherein said first edge attaches to said cover portion and said second edge attaches to said base portion, said shield providing viewing privacy for a laptop user.

7. The laptop transport and support system of claim 5 further comprising:

a docking station for the laptop or other computing device.

8. The laptop transport and support system of claim 5 further comprising:

a work tray retractable into said base portion, said work tray providing a surface for use of a pointing device or a general work area.

9. The laptop transport and support system of claim 5 wherein said cover portion contains a recession to accommodate a laptop to protect the laptop during transport.

10. The laptop transport and support system of claim 5 wherein said cover portion comprises a plurality of storage pockets for storage of computer accessories.

11. A laptop transport and support system for mobile environments comprising:

a base portion and a cover portion, said base portion and said cover portions being connected by a hinge to secure said cover portion to said base portion;

a first handle rod having a first end and a second end, said first end of said first handle rod retractable into said base portion;

a second handle rod having a first end and a second end, said first end of said second handle rod retractable into said base portion;

a handle connecting said second end of said first handle rod and said second end of said second handle rod, said handle comprising a first handle piece and a second handle piece, said first handle piece and said second handle piece being detachable from each other;

a first strap rod and a second strap rod, said first and second strap rods retractable relative to said base portion wherein said first strap rod connects with said second end of said first shoulder strap and said second strap rod connects with said second end of said second shoulder strap;

a first shoulder strap and a second shoulder strap, each of said first and second shoulder straps having a first end and a second end, said first end of said first shoulder strap and said first end of said second shoulder strap connected to said cover portion and said second end of said first shoulder strap is connected to said first strap rod and said second end of said second shoulder strap is connected to said second strap rod; and a first "C" hook at said first end of said first shoulder strap and a second "C" hook at said first end of said second shoulder strap, said first and said second "C" hooks to facilitate the hanging of said cover portion and said base portion during system use.

12. The laptop transport and support system for mobile environments of claim 11 further comprising:

a viewer shield attachable and detachable with said cover portion and said base portion to provide privacy for a laptop user.

13. The laptop transport and support system for mobile environments of claim 11 further comprising:

an on-board docking station for mating with the ports of the laptop.

14. The laptop transport and support system for mobile environments of claim 11 further comprising:

a work tray retractable into said base portion, said work tray providing a surface for use of a pointing device or a general work area.

15. The laptop transport and support system for mobile environments of claim 11 wherein said cover portion contains a recession to accommodate a laptop when said cover portion is mated to said base portion.

16. The laptop transport and support system for mobile environments of claim 11 further comprising:

a set of wheels attached to the system to facilitate movement of the system when said handle is pulled by a user.

17. The laptop transport and support system for mobile environments of claim 11 wherein said first handle rod and said second handle rod provide standoff for the system when the system is in its use position.

18. A laptop transport and support system adaptable to any seatback secured to a stationary object or a seatback within a mobile environment such as a plane, bus, automobile or other vehicle, the system comprising:

a base portion and a cover portion, said base portion and said cover portions being connected by a ratcheting piano hinge to secure said cover portion to said base portion, said base portion further comprising:

a plurality of compartments to accommodate peripheral devices, said compartments providing a not-in-use storage location and an in-use location for such devices;

a plurality of externally accessible slots in said compartments to permit accessories to connect inter-compartmentally with one another or directly to said laptop or other computing device;

a first handle rod having a first end and a second end, said first end of said first handle rod retractable into said base portion;

a second handle rod having a first end and a second end, said first end of said second handle rod retractable into said base portion;

a handle connecting said second end of said first handle rod and said second end of said second handle rod, said handle comprising a first handle piece and a second handle piece, said first handle piece and said second handle piece being detachable from each other;

a first strap rod and a second strap rod, said first and second strap rods retractable relative to said base portion wherein said first strap rod connects with said second end of said first shoulder strap and said second strap rod connects with said second end of said second shoulder strap;

a first shoulder strap and a second shoulder strap, each of said first and second shoulder straps having a first end and a second end, said first end of said first shoulder strap and said first end of said second shoulder strap connected to said cover portion and said second end of said first shoulder strap is connected to said first strap rod and said second end of said second shoulder strap is connected to said second strap rod; and a first "C" hook at said first end of said first shoulder strap and a second "C" hook at said first end of said second shoulder strap, said first and said second "C" hooks to facilitate the hanging of said cover portion and said base portion during system use.

19. The laptop transport and support system of claim 18, wherein said peripheral devices consist of a power converter, extra batteries, CD-ROM drives, floppy disk drives, and other computer-related components.

20. The laptop transport and support system of claim 18 further comprising:

a retractable docking station to interface with the laptop or other computing device, said retractable docking station having a modular interface to connect a desired hardware connector.

21. The laptop transport and support system for mobile environments of claim 18 further comprising:

a zippered interface between said cover and said base portions.

* * * * *

UNITED STATES PATENT AND TRADEMARK OFFICE
CERTIFICATE OF CORRECTION

PATENT NO. : 6,659,319 B2
DATED : December 9, 2003
INVENTOR(S) : William J. Purpura It is certified that error appears in the above-identified patent and that said Letters Patent is hereby corrected as shown below:

Column 3,
Lines 21, 24 and 31, "a laptop" should be -- the laptop --.
Line 25, delete "shown with support straps in back-pack mode".
Line 32, insert -- a -- before "seat-support mode".
Line 32, add the following paragraph: -- Figure 4A is an enlarged view of the end of the C-hook of the shoulder strap attached to the U-ring on the base of the system; --.
Line 36, first occurrence of "a" should be -- the --.
Line 40, second occurrence of "a" should be -- the --.
Line 43, delete "is" and insert -- illustrates a side view of the system showing --.
Line 45, add the following paragraph: -- Figure 8A illustrates the hinge of Figure 8 in greater detail; --.
Line 50, delete second occurrence "a" and insert -- the --.
Line 59, after "drawings," "a" should be -- the --.

Column 4,
Line 4, delete "perspective" .
Line 4, after second occurrence of "pawl" insert -- 22 --.
Line 17, after "cover's" insert -- 14 --.
Line 23, insert -- , -- after "1" .
Line 34, delete "Velcro" and insert -- VELCRO hook and loop style fastening cloth --.

Column 5,
Line 14, delete "Velcro" and insert -- VELCRO hook and loop style fastening cloth --.

Column 6,
Lines 18 and 21, "parts" should be -- ports --.
Line 40, insert after "Velcro" -- hook and loop style fastening cloth --.

UNITED STATES PATENT AND TRADEMARK OFFICE
CERTIFICATE OF CORRECTION

PATENT NO. : 6,659,319 B2
DATED : December 9, 2003
INVENTOR(S) : William J. Purpura It is certified that error appears in the above-identified patent and that said Letters Patent is hereby corrected as shown below:

Column 6 (cont'd),
Line 47, "airplane" should be -- aircraft --.

Signed and Sealed this

Twenty-third Day of August, 2005

JON W. DUDAS
*Director of the United States Patent and Trademark Office*